March 25, 1969  J. C. WENDLER  3,434,760
HOLDER FOR POSITIONING DIE-SET BEARING PARTS
Filed Oct. 27, 1966
FIG. 1
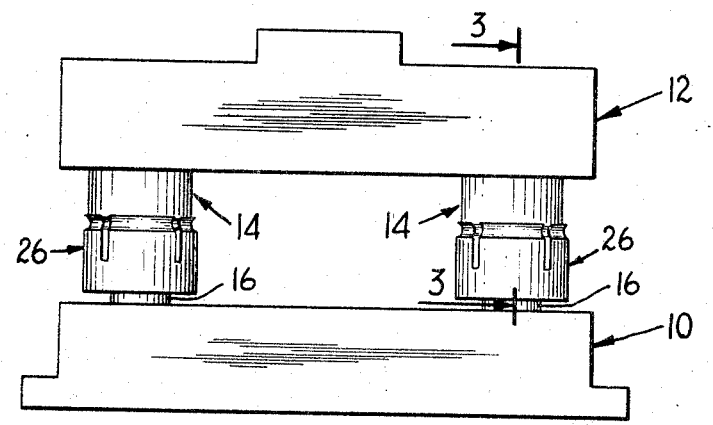
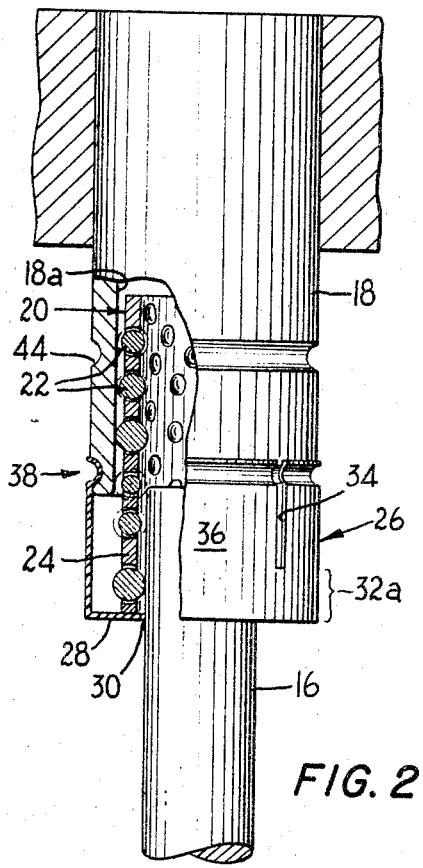
FIG. 2
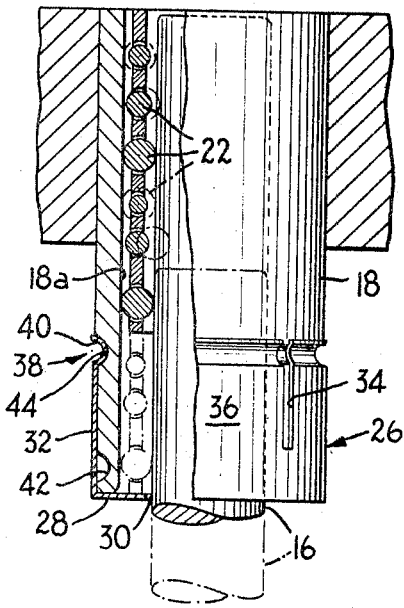
FIG. 3
INVENTOR.
JOHN C. WENDLER
BY
his ATTORNEYS

United States Patent Office 3,434,760
Patented Mar. 25, 1969

3,434,760
HOLDER FOR POSITIONING DIE-SET BEARING PARTS
John C. Wendler, Mineola, N.Y., assignor to Acme-Danneman Company, Inc., New York, N.Y., a corporation of New York
Filed Oct. 27, 1966, Ser. No. 590,010
Int. Cl. F16c 1/26, 17/00, 21/00
U.S. Cl. 308—4     5 Claims

ABSTRACT OF THE DISCLOSURE

The retainer of a die-set bearing is located and held in a predetermined position relative to the bushing by a cap-like holder having a base portion supporting the lower end of the retainer and a plurality of resilient fingers projecting up from the base and received in coacting detent formations on the holder and bushing. The holder is shiftable between, first, a position in which the retainer is supported in proper relation on the bushing for initial assembly of the bearing and, second, an operating position in which the holder prevents the retainer from sliding down and out of the bushing during operation of the die-set.

---

This invention relates to die-sets and, more particularly, to a novel and improved device for holding the antifriction element of the die-set bearing in predetermined positions relative to the leader pin and bushing.

In the assembly of ball or roller type die-set bearings, it is important that the ball or roller retainer be initially positioned with respect to the bushing and the leader pin such that, upon insertion of the leader pin, the retainer will be properly located in the bushing for movement between the upper and lower limits of the die-set stroke during operation. Although various arrangements have been proposed for initially positioning the retainer for proper assembly, such arrangements have created other problems, notably interference with the desired mode of operation of the bearing. For example, it has been proposed to use a pin and slot arrangement to restrict the extent of longitudinal movement of the antifriction element; this expedient, however, has the distinct disadvantage, in the case of ball-type bearings, of preventing relative rotation between the retainer and the bushing with the result that the balls move in precisely defined tracks throughout the service life of the bearing and therefore significantly reduce its useful life by concentrated, relatively rapid wear.

Another type of proposed arrangement for positioning bearing parts for initial assembly includes an element which is mounted for reciprocating sliding movement on either the bushing or the leader pin to engage and position the retainer. Because the member is movable and is subjected to shock and impact on each stroke of operation, and moreover because it must slide in frictional engagement with the part on which it is mounted, it is subject to wearing out relatively quickly. It also can break in operation, and pieces could very well fall into and irreparably damage the dies.

Another troublesome arrangement in die-set bearings is some device for keeping the bearing retainer from creeping out through the lower end of the bushing during operation of the die-set. Although the balls or rollers are usually preloaded between the leader pin and bearing and are thus frictionally held against sliding relative to the bushing and leader pin, there is still significant opportunity for the retainer to slide at the end of each stroke by reason of the high kinetic energy imparted to it, especially at the high operating speeds now in common use. The most prevalent form of device for keeping the retainer from being driven out of the bushing is an expansible lock ring installed in an internal groove at the lower end of the bushing. Lock rings, are, however, difficult to install and remove, require special tools and increase the shut-down time for disassembly of the die-set to replace the bearings.

The foregoing and other disadvantages of die-sets known in the art are overcome, in accordance with the invention, by a novel and improved die-set which incorporates a special fitting for both initially positioning the bearing parts with respect to each other for assembly and for keeping the retainer from being forced out of the bushing during operation. The special fitting is in the form of a holder member which is engageable with the retainer to position it at predetermined positions relative to the bushing, and an arrangmeent for movably securing the holder to the bushing. In a preferred embodiment, the holder is in the form of a cap-like member having a base portion which engages and supports the retainer and resilient elements joined to the base and coupled by a detent to the bushing. The detent is arranged to locate and hold the cap at (1) a first position in which the retainer projects part way out of the bushing to a predetermined extent such that insertion of the leader pin fully into the bushing also moves the retainer to its uppermost position in the operating stroke of the die-set, and (2) a second position in which it limits the downward movement of the retainer to its lowermost point of travel in the bushing.

The holder member thus performs two important functions in a die-set bearing, and yet it is inexpensive to manufacture and requires only a minor modification in the normal construction of a die-set bearing, namely the provision of one element of a detent on the hushing. Other than during the assembly or disassembly of the die-set, the holder remains stationary and is accordingly not subjected to wear and the possibility of breakage by reason of sliding movement. It is quickly and easily installed on the bearing without any special tools and therefore significantly reduces the time required for disassembly and assembly of the bearing. Because it can be made of plastic or some other soft resilient material, as well as from metal, the possibility of damage to the die in the event that the cap should break and a piece fall between the dies during operation is remote.

For a better understanding of the invention, reference may be made to the following description of an exemplary embodiment, taken in conjunction with the figures of the accompanying drawings, in which:

FIGURE 1 is a front elevational view of a die-set bearing constructed according to the invention in place on a typical die-set;

FIG. 2 is a view on an enlarged scale of the bearing of FIG. 1 with the parts shown in their positions at initial assembly, portions of the parts being broken away to more clearly illustrate the invention; and FIG. 3 is a view similar to FIG. 2, but showing the bearing parts in the positions they occupy when the die-set is closed.

Referring to FIG. 1, the die-set shown there comprises a stationary die holder 10 and a movable punch holder 12 of any suitable construction; many specific holders are known to those skilled in the art. The die and punch holders are arranged to accommodate dies and punches and, in turn, are adapted to be mounted in a punch press.

The holders, and therefore the punch and die, are kept in precise alignment with each other by the provision of two or more die-set bearing assemblies 14 suitably installed on the holders 10 and 12. The die holder 10 carries an upwardly projecting leader pin 16, while the punch holder 12 carries a downwardly extending bushing 18.

Relatively free movement of the die and punch holders toward and away from each other but retention of accurate alignment is afforded by an anti-friction element 20 constituted by, in this case, a multiplicity of balls 22 carried in a sleeve-like retainer 24. The diameter of the internal bore 18a of the retainer 18, the outer diameter of the pin 16 and the diameters of the balls 22 are such that the balls are placed under a compressive load when the bearing parts are in their assembled positions, as shown in FIG. 3. In this way, the possibility of a loose fit due to tolerance variations is avoided, and the bearings more precisely and firmly maintain alignment between the punch and die. The bearings may be of various specific forms; for example, the ball-type bearing might be replaced by a roller-type bearing in which the bushing retainer and leader pin are basically rectilinear in cross-section.

In operation of the die-set, the leader pin moves relative to the bushing a distance twice the distance that the retainer moves relative to the bushing. For example, if the die-set has a stroke of two inches, the retainer will move a distance of one inch during each stroke. Accordingly, the lengths of the bushing and the retainer will, in the design of the bearing, be related to each other and to the stroke of the die-set. Moreover, it is important that the retainer be properly positioned longitudinally with respect to the bushing when the die-set is initially assembled.

With reference now to FIGS. 2 and 3, the relationship between the bearing parts at the time that they are initially assembled (FIG. 2) and the position occupied by them at the limits of the die-set stroke (FIG. 3) may be best understood by considering specific exemplary dimensions. Assuming that the die-set is to have a two inch stroke, i.e., the distance which the leader pin moves with respect to the bushing, and that it is desirable to have a retainer two inches long, a bushing which will provide for the two inch stroke without any part of the retainer leaving the bore of the bushing will be three inches long. As illustrated in the solid lines of FIG. 3, at the closest approach of the punch holders 10 and 12 the upper ends of the bushing, retainer and leader pin will be in the same plane. As represented in phantom lines in FIG. 3, the lower end of the retainer will be aligned with the lower end of the bushing and the upper end of the leader pin will be two inches below its upper position when the die and punch holders 10 and 12 are at their greatest separation. Because it is, as a practical matter, impossible to adjust the positions of the bearing parts with respect to each other once the leader pin has come into loaded engagement with the balls, it is necessary for the initial assembly of the bearing to begin with the parts in predetermined positions but in which there is no forced or loaded engagement between the leader pin, balls and bushing.

In particular, the optimum conditions for initial assembly of the die set are shown in FIG. 2. The leader pin is positioned very nearly flush with the lower end of the bushing, just at the point before it comes into loaded engagement with a group of balls in the retainer. Once the leader pin moves up relative to the bushing just a slight amount, the balls become preloaded between it and the bushing, and opportunity for relative movement is considerably restricted. Though it may be possible to adjust the positions of the leader pin with respect to the balls after loaded engagement, it would be highly possible for one or more parts of the bearing to be damaged by a forced sliding.

With the dimensions assumed above, the leader pin is thus located approximately three inches below its uppermost position. Therefore, the leader pin must travel three inches to reach the upper limit of its stroke with respect to the bushing which means, in turn, that the retainer must move 1½ inches to reach its uppermost position. Therefore, proper assembly of the bearing requires that the upper end of the retainer be located 1½ inches below the upper end of the bushing, thereby positioning its lower end ½ inch below the lower end of the bushing.

The above-described initial positioning is well known to those skilled in the art, and in the normal assembly of die-set bearings the machinist will use every care to properly position the retainer with respect to the bushing and leader pin. Oftentimes, a temporary jig arrangement might be used to support the retainer at the proper level above the lower holder 10 and the upper holder and bushings then moved into position for insertion. However, before the actual assembly can be completed, the temporary jig must be removed, thereby affording an opportunity for displacement of one or more of the parts with respect to each other. Where the bearing is provided with some sort of locating device, such as those of the type mentioned above, the assembly procedure is somewhat facilitated, but other disadvantages arise.

In accordance with the present invention, a cap-like holder member 26 is provided to precisely locate the retainer with respect to the bushing for initial assembly. More particularly, the holder member 26 is a one-piece, generally cylindrical element having a base 28 formed with a central hole 30 to admit the leader pin 16 and a flange 32 extending upwardly from and joined to the periphery of the base 28. The lower portion 32a of the flange 32 is circumferentially continuous, but the upper portion is formed with a number of spaced-apart slits 34 which subdivide it into a series of resiliently deflectable finger portions 36.

The holder member and bushing are adapted to be connected together with the holder member positioned in either of two positions by a releasable coupling, such as a detent arrangement 38 afforded by inwardly projecting, rolled edge formations 40 extending along the upper edges of the finger elements 36 and spaced-apart grooves 42 and 44 formed in the outer wall of the bushing 14. When the edge formations 40 on the holder member reside in the lower groove 42, the base 28 of the holder member is located a predetermined distance below the lower end of the bushing 14 so that the retainer 24 is supported relative to the bushing 14 and leader pin 16 for proper initial assembly of the bearing. In particular, the retainer is located so that it will move up to its upper limit position, as shown in FIG. 3, upon movement of the leader pin 16 to its uppermost position. With reference to the specific dimensions referred to above, the base 28 will be located about ½ inch below the lower end of the bushing, thereby locating the upper end of the retainer 1½ inches from its upper limit position. Meanwhile the leader pin can be moved freely into the position illustrated in FIG. 2, that is, the position where its upper end is located just out of pressure engagement with the lowermost row of balls 22 which lie within the bushing. Accordingly, the leader pin 16 will move upwardly a distance of three inches and, upon pressure engagement of the leader pin with the balls, the retainer 24 will move upwardly a distance of 1½ inches, thereby placing the parts in the positions illustrated in solid lines in FIG. 3.

At this point, the holder member 26 can be moved to its upper position, the position illustrated in FIGS. 1 and 3. In this position, the base 28 blocks the lower end of the bushing bore 18a and will prevent the retainer from being driven out through the lower end of the bushing. The connecting force afforded by the detent 38 can be made sufficiently large to resist any load imposed upon the holder member by its engagement with the retainer, as illustrated by the phantom lines in FIG. 3 which show the lower limit position of the bearing. With the holder member locked in its upper position, the die set is ready for operation.

In use, the assembly procedure may be as follows. The holder member is snapped onto the bushing of each die-set bearing in its lower position (FIG. 2). The retainers are then inserted through the tops of the bushings and are supported by the holder. The upper holder is then moved into aligned position above the lower holder and then carefully lowered to locate the leader pins in the position shown in FIG. 2. The dies may then be moved to closed position (solid lines of FIG. 3). If the separation between the holders 10 and 12 is such that the holder members 26 engage the die holder 10 before the die-set is closed, the movement to closed position will automatically unlock the lower detents and move the holder members on the several bearings toward their upper positions. Otherwise, the holder member 26 may be manually moved to the operating position shown in FIG. 3. The die-set is then ready for normal operation.

When it becomes necessary to change a worn-out bearing or otherwise disassemble the parts, it is merely necessary to pull the leader pin 16 downwardly relative to the bushing. Normally, a reasonable force exerted on the leader pins will be sufficient to release the detent couplings 38 and pull the holder members into their lower positions where they will support the retainers in the position shown in FIG. 2. However, it would be appropriate to manually relocate the holder members. Thereafter, the leader pins can be freely removed to fully disassemble the die-set.

Thus there is provided, in accordance with the invention, a novel and improved die-set bearing which incorporates an inexpensive and trouble-free holder member for both positioning the bearing parts for initial assembly and keeping the retainer from being driven out of the bushing in operation. It is easy to install, reduces shutdown time, and ensures proper initial assembly.

The above-described embodiment of the invention is merely exemplary, and those skilled in the art will be able to make numerous variations and modifications of it without departing from the spirit and scope of the invention. All such variations and modifications are intended to be included within the scope of the invention as defined in the appended claims.

I claim:

1. In a die-set or the like comprising upper and lower members movable toward and away from each other and a bearing having a bushing on the upper member, a retainer carrying antifriction elements and movable in the bushing, and a leader pin on the lower member movable within and relative to the retainer and bushing, the improvement comprising holder means engageable with the retainer to locate and hold it in predetermine positions relative to the bushing including a first lower position for initial assembly of the bearing where the retainer partially projects from the bushing to an extent such that the leader pin may be inserted into the bushing so as to move the retainer up into its uppermost operating position in the bushing and a second upper position spaced above the lower position where the lower end of the retainer is located at its lower limit position in the bushing during a working stroke, and releasable means fixedly securing the holder means to the bushing at each of the said predetermined positions to restrict movement of the retainer in operation of the die while permitting the holder means to be shifted at will between the predetermined positions.

2. A die-set according to claim 1 wherein the holder means includes a member having a retainer engaging portion and resilient elements connected to said portion, and wherein the securing means includes a detent coupling between the resilient elements and the bushing.

3. A die-set according to claim 2 wherein the detent coupling in at least the second position secures the holder means to the bushing with a force sufficient to prevent the retainer from sliding out through the lower end of the bushing when the die-set is in operation.

4. A die-set according to claim 1 wherein the holder means includes a cap-like member having a base, an opening in the base to receive the leader pin, a plurality of resilient fingers joined to the base, and formations on the resilient fingers constituting a part of the securing means.

5. A die-set according to claim 1 wherein the holder means includes a cap-like member having a base engageable with the lower end of the retainer, an opening in the base to admit the leader pin therethrough, a flange extending upwardly from the base having a continuous lower portion joined to the base, a plurality of slits in the upper portion of the flange defining a plurality of resilient fingers, and a projecting formation at the upper end of each of the resilient fingers, and wherein the securing means includes the said projecting formation and a pair of spaced-apart formations on the bushing cooperative with the said projecting formation on the resilient finger portions of the cap-like member, the lowermost of the said formations on the bushing being located to hold the retainer in a position partially projecting from the bushing to an extent such that insertion of the leader pin fully into the bushing moves the retainer up to its uppermost location in the operative stroke of the die-set, and the uppermost of the formations on the bushing being located to secure the cap-like member at a position where the lower end of the retainer is located within the lower end of the bushing at its lower limit position in the operative stroke of the die-set.

References Cited

UNITED STATES PATENTS

| | | |
|---|---|---|
| 754,452 | 3/1904 | Howe _____ 292—87 |
| 1,179,453 | 4/1916 | Paton _____ 292—17 |
| 1,887,611 | 11/1932 | Wittenberg _____ 292—76 X |
| 2,768,766 | 10/1956 | Woebbeking _____ 292—17 X |
| 2,774,430 | 12/1956 | Blazek _____ 308—4 |
| 2,846,278 | 8/1958 | Blazek. |
| 3,149,887 | 9/1964 | Moyer _____ 308—4 X |
| 3,253,868 | 5/1966 | Danly. |

JULIUS E. WEST, *Primary Examiner.*

U.S. Cl. X.R.

308—6; 74—527